US011678130B2

(12) United States Patent
Cavallari et al.

(10) Patent No.: US 11,678,130 B2
(45) Date of Patent: Jun. 13, 2023

(54) METHOD FOR SETTING UP A SHORT-RANGE RADIO CONNECTION, AND HEARING DEVICE

(71) Applicant: SIVANTOS PTE. LTD., Singapore (SG)

(72) Inventors: Riccardo Cavallari, Erlangen (DE); Stefan Mijovic, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 43 days.

(21) Appl. No.: 17/386,881

(22) Filed: Jul. 28, 2021

(65) Prior Publication Data
US 2022/0038834 A1 Feb. 3, 2022

(30) Foreign Application Priority Data
Jul. 28, 2020 (DE) ............... 10 2020 209 508.6

(51) Int. Cl.
*H04R 25/00* (2006.01)
*H04W 76/18* (2018.01)
(Continued)

(52) U.S. Cl.
CPC ............ *H04R 25/554* (2013.01); *H04W 4/80* (2018.02); *H04W 12/06* (2013.01); *H04W 12/50* (2021.01);
(Continued)

(58) Field of Classification Search
CPC .. H04R 25/55; H04R 25/554; H04R 2225/55; H04W 12/50
See application file for complete search history.

(56) References Cited

U.S. PATENT DOCUMENTS 9,504,076 B2 * 11/2016 El-Hoiydi ............... H04W 4/21
9,924,358 B2 * 3/2018 Weizman ............. H04W 12/06
(Continued)

FOREIGN PATENT DOCUMENTS

| CA | 2814290 A1 | 4/2013 |
|----|------------|--------|
| WO | 2015028050 A1 | 3/2015 |
| WO | 2017174134 A1 | 10/2017 |

OTHER PUBLICATIONS

Findikli Ayse et al.: "Specification of the Bluetooth System version: 2.1—EDR, Specification vol. 2—Core System Package [Controler volume]", Jul. 26, 2007 (Jul. 26, 2007), pp. 1, 699-709, XP055869877 URL:https://www.bluetooth.com/specifications/specs/cs-core-specification-2-1edr/ [retrieved Dec. 6, 2021].

*Primary Examiner* — Ryan Robinson
(74) *Attorney, Agent, or Firm* — Laurence A. Greenberg; Werner H. Stemer; Ralph E. Locher

(57) ABSTRACT

A method for setting up a short-range radio connection, in particular a Bluetooth connection, provides a connection between two devices, namely a hearing device and an additional device. The hearing device has a switch as an input element and a receiver as an output element. The additional device has an input element and an output element. A reciprocal authentication is performed by using a respective device to generate a character string and transmitting the character string to the other device. A check code is subsequently generated on both devices using both respective character strings and output to a user through the respective output element. The authentication is completed successfully and then a short-range radio connection is set up if a confirmation from the user that the check codes that have been output match, is received through the respective input element. A corresponding hearing device is also provided.

8 Claims, 1 Drawing Sheet

(51) Int. Cl.
*H04W 4/80*     (2018.01)
*H04W 12/50*    (2021.01)
*H04W 12/06*    (2021.01)

(52) U.S. Cl.
CPC ............. *H04W 76/18* (2018.02); *H04R 25/70* (2013.01); *H04R 2225/55* (2013.01)

(56) References Cited

U.S. PATENT DOCUMENTS

| | | |
|---|---|---|
| 10,187,733 B2 | 1/2019 | Schneider et al. |
| 10,250,692 B2 | 4/2019 | Mohapatra et al. |
| 10,510,446 B2 * | 12/2019 | Westermann .......... G16H 10/65 |
| 10,523,805 B2 * | 12/2019 | Rostaing ................ G06F 3/165 |
| 2003/0045283 A1 * | 3/2003 | Hagedoorn .......... H04R 25/558 |
| | | 455/557 |
| 2008/0165994 A1 * | 7/2008 | Caren ................. H04R 25/554 |
| | | 455/41.2 |
| 2011/0217950 A1 * | 9/2011 | Kozlay ................ H04W 12/50 |
| | | 455/410 |
| 2014/0046664 A1 | 2/2014 | Sarkar et al. |
| 2014/0073249 A1 | 3/2014 | Glezerman et al. |
| 2015/0099466 A1 | 4/2015 | Narendra et al. |
| 2017/0257472 A1 * | 9/2017 | Gehring ............. H04M 1/2475 |
| 2019/0037380 A1 | 1/2019 | Pedersen et al. |
| 2019/0110140 A1 | 4/2019 | Dickmann et al. |
| 2019/0387128 A1 * | 12/2019 | Kawai ................ H04N 1/00411 |

\* cited by examiner

METHOD FOR SETTING UP A SHORT-RANGE RADIO CONNECTION, AND HEARING DEVICE

CROSS-REFERENCE TO RELATED APPLICATION

This application claims the priority, under 35 U.S.C. § 119, of German Patent Application DE 10 2020 209 508.6, filed Jul. 28, 2020; the prior application is herewith incorporated by reference in its entirety.

BACKGROUND OF THE INVENTION

Field of the Invention

The invention relates to a method for setting up a short-range radio connection, in particular a Bluetooth connection, between a hearing device and an additional device. The invention also relates to a corresponding hearing device.

A short-range radio connection is a connection by radio e.g. at a transmission frequency of a few GHz over a short distance of e.g. no more than several tens of meters between two devices and is used for data transfer, i.e. for interchanging data between those two devices. An example of a short-range radio connection is a Bluetooth connection. A short-range radio connection is set up between two devices by virtue of the devices interchanging coupling data prior to the actual connection, i.e. when the connection is being set up, to couple the two devices and thus ultimately to make the short-range radio connection. Bluetooth technology in general and the setup of a Bluetooth connection in particular are described in the Bluetooth specification, more precisely BLUETOOTH CORE SPECIFICATION Version 5.2, which can be retrieved from www.bluetooth.com, for example.

A hearing device is routinely used for treating a user with impaired hearing. To that end, the hearing device has a microphone that picks up sound from the surroundings and generates an electrical input signal. That signal is fed to a signal processor of the hearing device for modification. The modification takes place in particular on the basis of an individual audiogram of the user associated with the hearing device, so that an individual hearing deficiency of the user is compensated for. As a result the signal processor outputs an electrical output signal that is then converted back into sound and output to the user through a receiver of the hearing device.

It is routinely necessary for a user to connect two devices for data interchange, specifically by using a short-range radio connection, since that ensures a high level of mobility and flexibility, with simultaneous security due to the limited range. By way of example, it is conceivable for a hearing device to be coupled to a smartphone in order to control or adjust the hearing device using the smartphone, or conversely to transmit data from the hearing device to the smartphone and process them there, for example.

The coupling, also referred to as pairing, of two devices by using a short-range radio connection is potentially susceptible to so-called "man-in-the-middle" attacks (MITM attacks for short), which involve a first device being connected not to the intended second device but rather to a different, third-party device. Accordingly, the aforementioned Bluetooth specification provides various options for improving security for the coupling. Coupling and various methods for coupling are described in the Bluetooth specification, specifically under Vol. 3, Part H, 2.3 "Pairing Methods." The essence in that case is the use of a key for authenticating the two devices that are intended to be coupled, possibly in combination with a user interaction, to improve security further. One problem, however, is that not every device is suitable for a user interaction. The Bluetooth specification, specifically the section already cited, therefore distinguishes between different capabilities for user interaction, which are also referred to as input and output capabilities or as "IO capabilities." Depending on the existing capability of the two devices, suitable methods for coupling are then assigned in table 2.8 of the cited section. A hearing device in particular typically has neither a keypad (keyboard) nor a screen (display) and therefore inherently falls into the "no input, no output" class. The authentication for that class is not very safe, however.

U.S. Pat. No. 9,924,358 B2 describes a method for authentication in which a telephone as a Bluetooth host is paired with an additional device as a Bluetooth device. In response to a key request, the additional device generates a key that is output to a user through a loudspeaker by using a text-to-speech module. The telephone requests the key from the user, the key then being input into the telephone by the user by using a keypad. The keys are then compared with one another in accordance with the Bluetooth specification in order to complete the authentication. The additional device in that case has just an output capability, but not an input capability. All in all, the authentication is performed by using the so-called "passkey entry" method, which is described in the cited Bluetooth specification.

Additional mention goes to: Canadian Patent Application CA 2 814 290 A1, corresponding to U.S. Patent Application Publication No. 2014/0073249 A1; U.S. Pat. No. 10,250,692 B2; U.S. Patent Application Publication No. 2014/046664 A1; U.S. Patent Application Publication No. 2015/099466 A1; International Publication WO 2015/028050 A1, corresponding to U.S. Pat. No. 10,187,733 B2; and International Publication WO 2017/174134 A1, corresponding to U.S. Patent Application Publication No. 2019/0110140 A1.

BRIEF SUMMARY OF THE INVENTION

It is accordingly an object of the invention to provide an improved method for setting up a short-range radio connection, and a hearing device that can be coupled to an additional device by using such a method, which overcome the hereinafore-mentioned disadvantages of the heretofore-known methods and devices of this general type and which improve the setup of a short-range radio connection between a hearing device and an additional device and make the setup as secure as possible, specifically against "man-in-the-middle" attacks.

With the foregoing and other objects in view there is provided, in accordance with the invention, a method for setting up a short-range radio connection, in particular a Bluetooth connection, between two devices, namely a hearing device and an additional device, wherein the hearing device has a switch as an input element and a receiver as an output element, the additional device has an input element and an output element, a reciprocal authentication is carried out by virtue of a respective device generating a character string and transmitting that character string to the other device and by virtue of a check code subsequently being generated on both devices using both character strings in each case and being output to a user through the respective output element, and the authentication is completed successfully and then a short-range radio connection is set up if a confirmation from the user that the check codes that have been output match, is received through the respective input element.

Advantageous configurations, developments and variants are the subject of the subclaims. The explanations in association with the method also apply logically to the hearing device, and vice versa. Where method steps of the method are described below, advantageous configurations are obtained for the hearing device in particular by virtue of the hearing device being configured to perform one or more of these method steps.

The method is used to set up a short-range radio connection, in particular a Bluetooth connection, between two devices, namely a hearing device and an additional device. The additional device and the hearing device are also referred to as first device and second device or as device A and device B or as initializing and non-initializing device, the assignment of the terms to a respective device being arbitrary per se. The two devices accordingly each have an interface for the short-range radio connection, e.g. an antenna, in particular a Bluetooth antenna. The setup of the short-range radio connection is also referred to as coupling or pairing. The short-range radio connection is distinguished in particular in that it has a limited range of no more than a few tens of meters and a transmission frequency in the region of a few GHz. In the case of a Bluetooth connection, this is preferably a Bluetooth low energy connection, also referred to as BLE.

The hearing device has a switch as an input element and a receiver as an output element. The additional device has an input element and an output element. All in all, both devices therefore each have an input element and an output element. At least in the case of the hearing device, the input element and the output element are different from one another. In the case of the additional device, the input element and the output element coincide to form a single input/output element or are in separate form, as in the case of the hearing device.

The method involves a reciprocal authentication being carried out, i.e. the two devices authenticate one another in order to check that the short-range radio connection is also actually made between the hearing device and the additional device as intended and not erroneously between one of the two devices and a third-party device. The reciprocal authentication is carried out by virtue of a respective device generating a character string and transmitting that character string to the other device and by virtue of a check code subsequently being generated on both devices using both character strings in each case and being output to a user through the respective output element. These two-character strings are simple values, for example, and are also referred to as private character strings, specifically also as "nonce values." In the case of the hearing device, the check code is output as a sound signal; in the case of the additional device, the check code is displayed or output in another way, for example.

The respective character string is generated by the respective device independently and is preferably generated at random. The respective character string is in particular a one-time character string, also referred to as a one-time key, which is used just for a single attempt to set up a short-range radio connection, since the character string is transmitted, of course, and can therefore potentially be intercepted. On a fresh attempt, i.e. when the method is carried out again, a new character string is suitably generated.

The transmission of the two-character strings preferably follows a protocol, in particular as shown in FIG. 2.3 in the section Vol. 3, Part H, 2.3 "Pairing Methods" of the cited Bluetooth specification 5.2. In general, the two-character strings are transmitted by virtue of each of the two devices additionally providing a public key and transmitting that public key to the respective other device, so that each of the two devices knows the two public keys and also its own private character string. Without restricting the generality, one of the devices is referred to as device A below and the other device as device B and it is assumed that device A is the initializing device and device B is the non-initializing device. Device B uses a predetermined function to generate from the two public keys and its own private character string a confirmation key, which is transmitted to device A, whereupon this device A transmits its character string back to device B, so that device B is now in possession of both character strings. Device B then sends its character string to device A, so that device A is now also in possession of both character strings. Device A now calculates a confirmation key in the same way as device B and checks whether that confirmation key matches the confirmation key that device B has transmitted. In this case, device A calculates the confirmation key using the same function and on the basis of the two public keys and the character string of device B, but the individual character string of device A is not used for this. In particular, this ensures that the character string was interchanged with the correct device. The function is known publicly, for example; preferably, the function f4 mentioned in the cited Bluetooth specification in the section Vol. 3, Part H, 2.2.6 "LE Secure Connections confirm value generation function f4" is used. If the two confirmation keys match, device A generates a check code from the two public keys and the two-character strings and outputs that check code. In the same way, device B also generates a check code and likewise outputs that check code. The check code is preferably a six-digit numeric string. If a "man-in-the-middle" attack takes place, the two check codes have a high probability of being different.

Both devices now wait for the respective check code to be confirmed by a user. The user can now compare the two check codes and, in the event of a match, input a confirmation on each of the two devices. The authentication is then completed successfully and then a short-range radio connection is set up if a confirmation from the user that the check codes that have been output match, is received through the respective input element. In the case of a Bluetooth connection, the "numeric comparison" method according to the cited Bluetooth specification is therefore performed. The confirmation is a simple input that is merely used for confirmation but does not include an input of a key or of a check code. Unlike in the "passkey entry" method, a confirmation key is transmitted only in one direction between the two devices in the present case, and not in both directions. Another difference from the "passkey entry" method is that only a confirmation of the check codes matching is awaited from the user, but not an input of the check code in one or both of the devices. Such an input of a check code is not necessary in the present case. In contrast to the "just works" method of the cited Bluetooth specification, however, a confirmation of the check code on both devices is imperative for a successful authentication in the present case. On the other hand, the "just works" method dispenses with a confirmation by the user, and the confirmation keys matching is already regarded as sufficient for a successful authentication.

Preferably, the input element allows a "yes/no" input, i.e. a selection of one of two responses. An input element that allows just a single response, which is then rated as "yes,"

i.e. as confirmation, is likewise suitable too. The absence of a response is then in particular rated as "no," i.e. as a rejection. A simple input of this kind is advantageously realized by using an input element that is already present on the hearing device, for example by using a rocker switch, which generally has at least two and typically three positions. Preferably, the switch has a central neutral position and can be transferred to a second position by pushing it forward and to a third position by pushing it back. Usefully, the switch automatically returns to the neutral position. Such a switch is already present for volume adjustment or for program selection, for example. However, a simple pushbutton switch is also inherently conceivable and suitable as a switch that allows at least a confirmation, that is to say just a "yes" input, or another switch having suitable functionality.

A central concept of the present invention is in particular to use a receiver of a hearing device as an output element and a switch of the hearing device as an input element, so that the hearing device can be connected to an additional device, which likewise has an input element and an output element, particularly securely, namely by using reciprocal confirmation of a key on both devices. Specifically when setting up a Bluetooth connection, the hearing device therefore preferably identifies itself as a device of the "Display Yes/No" class, and the setup, i.e. a coupling, appropriately takes place by using the "numeric comparison" method according to the Bluetooth specification cited at the outset. In other words: a simple confirmation on both devices is sufficient in the present case; input of the key on one or on both devices is not required. Despite the limited input and output capabilities (i.e. "IO capabilities") of the hearing device, security when setting up the short-range radio connection is then nevertheless advantageously improved.

An advantage of the invention is in particular that a hearing device, which itself has no capability to display the check code and also no capability to input a check code, is nevertheless coupled, i.e. connected, to another device, namely an additional device, particularly securely by way of a short-range radio connection. For the purposes of the cited Bluetooth specification, a hearing device actually belongs to the "no input, no output" class, since neither a keypad (keyboard) nor a screen (display) is present. Therefore, irrespective of the additional device, only the "just works" method is actually available for setting up a short-range radio connection, which method includes no authentication, however, and is therefore not very secure. In U.S. Pat. No. 9,924,358 B2 cited at the outset, the telephone described therein belongs to the "keyboard display" class in view of its "IO capabilities," whereas the additional device belongs to the "display only" class on the basis of the output by a loudspeaker, since although no screen is present there is a loudspeaker by way of which an output is possible. An input is not possible, however. According to the already cited table 2.8, coupling by using the "passkey entry" method can then be realized, the method including an authentication and accordingly being more secure than the "just works" method. Unlike that, an even more secure "numeric comparison" method is now rendered possible in the present case.

The hearing device is preferably used for treating a user with impaired hearing. To this end, the hearing device has a microphone that picks up sound from the surroundings and generates an electrical input signal. That signal is fed to a signal processor of the hearing device for modification. The signal processor is preferably a part of the control unit. The modification takes place in particular on the basis of an individual audiogram of the user associated with the hearing device, so that an individual hearing deficiency of the user is compensated for. As a result the signal processor outputs an electrical output signal that is then converted back into sound and output to the user through a receiver of the hearing device.

Alternatively, the hearing device is just configured to output sound from an audio source and accordingly has a receiver, for sound output, and an input, for receiving an electrical audio signal from the audio source. In a suitable configuration, the hearing device is headphones.

Preferably, the hearing device is a binaural hearing device, having two individual devices that, when used as intended, are worn by the user on different sides of the head, namely one in or on the left ear and one in or on the right ear.

In a preferred configuration, the hearing device identifies itself as a device that has both an input element and an output element. The result of this, specifically when setting up a Bluetooth connection, is that the hearing device identifies itself as a device of the "display yes/no" class, as already mentioned earlier on. Although the hearing device does not have a screen, it nevertheless indicates the "display" property, since, as an alternative to a screen, the receiver is used as an output element. Since the switch means that there is also a simple input capability, the "yes/no" property is indicated in this regard, since the switch allows at least a confirmation ("yes") and therefore automatically also a rejection ("no"), e.g. as a result of non-operation or a specific switching position therefor.

The additional device is preferably a mobile terminal, in particular a smartphone, alternatively a notebook, tablet, TV set or the like. In each case, the additional device has both an output element and an input element. The output element in this instance is a screen of the additional device, and the input element is a switch, e.g. a pushbutton switch, or likewise the screen. The method involves the additional device identifying itself in particular as a device of the "keyboard display" or at least "display yes/no" class according to the cited Bluetooth specification.

The hearing device usefully has a text-to-speech module that the hearing device uses to convert the check code into an audio signal for output through the receiver. Therefore, the check code is output as speech on the hearing device and read aloud, as it were, to the user, so that the user can hear and understand the check code and can compare it with the check code displayed on the screen of the additional device.

The authentication and therefore also the setup of the short-range radio connection are usefully terminated if a rejection is detected or assumed. This is possible in various ways; four suitable configurations are indicated below, which are basically also combinable with one another.

In a first suitable configuration, the authentication is terminated if a rejection from the user is received. The switch of the hearing device is in the form of a two-way switch, for inputting a confirmation on one hand and a rejection on the other hand. This advantageously allows the user to actively display a rejection. The rejection is therefore also referred to as active rejection in this case.

In a second suitable configuration, the authentication is terminated if a rejection from the user is received, the switch of the hearing device being in a form such that a confirmation and a rejection can be input by operating the switch for different lengths of time. In this case too, the rejection is an active rejection, since the user can explicitly perform an applicable input. Instead of using a two-way switch or generally a switch having multiple switching positions, however, a particularly simple pushbutton switch or button is now already sufficient, since a confirmation or rejection can be displayed just by using the period of operation. Accordingly, the switch is preferably a pushbutton switch or button.

In a third suitable configuration, the authentication is terminated automatically if no confirmation is received over a predetermined period, i.e. no operation of the switch. The rejection is therefore also referred to as passive rejection, since in contrast to the aforementioned active rejection there is now no call for active action by the user. The period is 1 s to 1 min, for example.

In a fourth suitable configuration, the authentication is terminated if the hearing device is switched off by the user. Precisely how the hearing device can be switched off is of lesser significance, e.g. the hearing device has an on/off switch for this purpose. The switching off of the hearing device is interpreted as the rejection in this instance. Since an explicit action by the user is required, an active rejection is present in this case.

With the objects of the invention in view, there is concomitantly provided a hearing device according to the invention configured to carry out a method as described above. Preferably, the hearing device has a control unit for this purpose. The method steps carried out by the hearing device are implemented in the control unit in particular by programming or circuitry, or a combination thereof. By way of example, the control unit is in the form of a microprocessor or in the form of an ASIC, or in the form of a combination thereof, for this purpose.

Other features which are considered as characteristic for the invention are set forth in the appended claims.

Although the invention is illustrated and described herein as embodied in a method for setting up a short-range radio connection, and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
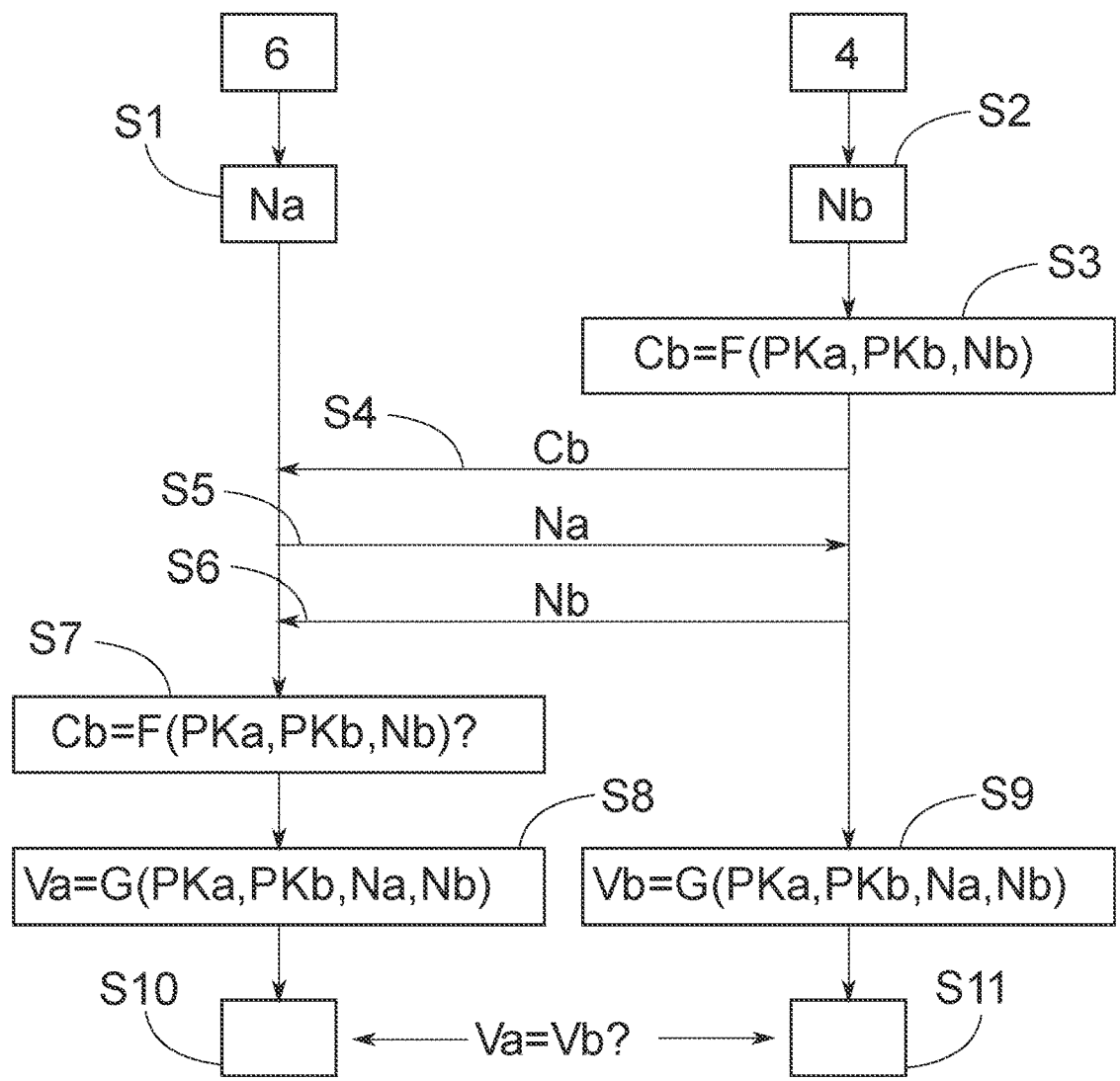
FIG. 1 is a block diagram showing a method for setting up a short-range radio connection.

Referring now to the figures of the drawings in detail and first, particularly, to FIG. 1 thereof, there is seen an exemplary embodiment of a method for setting up a short-range radio connection 2, in this case specifically a Bluetooth connection, between two devices 4, 6, namely a hearing device 4 and an additional device 6. The two devices 4, 6 each have an interface, which is not shown explicitly, for the short-range radio connection 2, e.g. an antenna, in this case a Bluetooth antenna. The setup of the short-range radio connection 2 is also referred to as coupling or pairing. The short-range radio connection 2 is distinguished in the present case by its having a limited range of no more than a few tens of meters and also a transmission frequency in the region of a few GHz.

Figure 2:
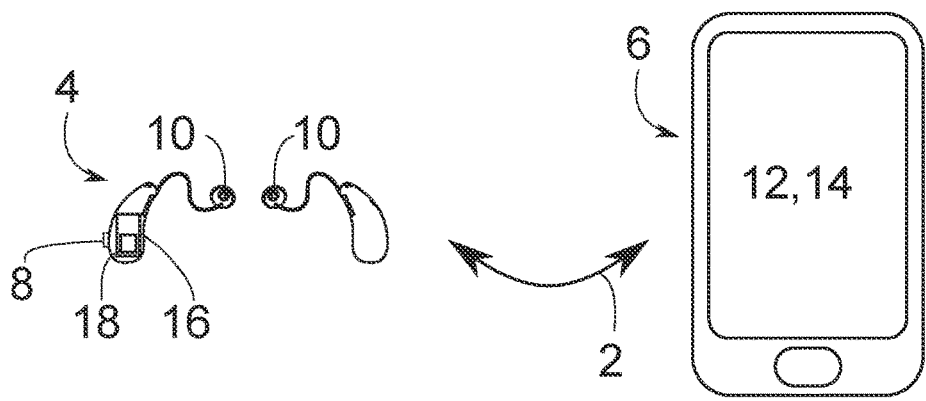
FIG. 2 is a diagrammatic, plan view of a hearing device and an additional device.

Exemplary embodiments of the two devices 4, 6 are shown in FIG. 2, which also shows the short-range radio connection 2. The hearing device 4 has a switch 8 as an input element 8 and a receiver 10 as an output element 10. The additional device 6 has an input element 12 and an output element 14. In the case of the hearing device 4, the input element and the output element are different from one another. In the case of the additional device 6, the input element 12 and the output element 14 coincide to form a single input/output element, but are in separate form, as is the case of the hearing device 4 in a variant that is not shown.

The method involves a reciprocal authentication being carried out, i.e. the two devices 4, 6 authenticate one another in order to check that the short-range radio connection 2 is also actually made between the hearing device 4 and the additional device 6 as intended and not erroneously between one of the two devices 4, 6 and a third-party device, which is not shown. The reciprocal authentication is carried out by virtue of a respective device 4, 6 generating a character string Na, Nb and transmitting that character string to the other device 4, 6 and by virtue of a check code Va, Vb subsequently being generated on both devices 4, 6 using both character strings Na, Nb in each case and being output to a user through the respective output element 10, 14. These two-character strings Na, Nb are also referred to as private character strings Na, Nb. In the case of the hearing device 4, the check code Va, Vb is output as a sound signal; in the case of the additional device 6, the check code Va, Vb for example is displayed or output in another way.

The respective character string Na, Nb is generated by the respective device 4, 6 independently and in the present case is generated at random. In FIG. 1, the additional device 6 generates the character string Na in step S1; the hearing device 4 generates the character string Nb in step S2 in FIG. 1, which takes place simultaneously or with staggered timing with respect to step S1. The respective character string Na, Nb in this case is a one-time character string, which is used just for a single attempt to set up a short-range radio connection 2. On a fresh attempt, a new character string Na, Nb is generated.

As can be seen in FIG. 1, the transmission of the two-character strings follows a protocol as shown in FIG. 2.3 in the section Vol. 3, Part H, 2.3 "Pairing Methods" of the Bluetooth specification 5.2 already cited at the outset. The timing of the method is obtained from reading FIG. 1 from top to bottom. The two-character strings Na, Nb are transmitted, and additionally each of the two devices 4, 6 provides a public key PKa, PKb and transmits it to the respective other device 4, 6, so that each of the two devices 4, 6 knows the two public keys PKa, PKb and also its own private character string Na, Nb. The transmission of the public keys PKa, PKb is not shown explicitly in FIG. 1 and can basically also take place outside the actual method.

Without restricting the generality, the additional device 6 is referred to as device A below and the hearing device 4 as device B and it is assumed that device A is the initializing device and device B is the non-initializing device. The additional device 6 and the method steps associated therewith are depicted on the left in FIG. 1, whereas the hearing device 4 and the method steps associated therewith are depicted on the right. In step S3, the hearing device 4 uses a predetermined function F to generate, from the two public keys PKa, PKb and its own character string Nb, a confirmation key Cb, which is transmitted to the additional device 6 in step S4, whereupon the additional device transmits its private character string Na back to the hearing device 4 in step S5, so that the hearing device is now in possession of both character strings Na, Nb. The hearing device 4 then sends its character string Nb to the additional device 6 in step S6, so that the additional device 6 is now also in possession of both character strings Na, Nb. The additional device 6 now calculates a confirmation key Cb in step S7 in the same way as the hearing device 4 and checks whether that confirmation key matches the confirmation key Cb that the hearing device 4 has transmitted. In this case, the additional device 6 calculates the confirmation key Cb using the same function F and on the basis of the two public keys PKa, PKb and the character string Nb of the hearing device 4, but the individual character string Na of the additional device 6 is not used for this. If the two confirmation keys Cb match, the additional device 6 generates a check code Va from the two keys PKa, PKb and the two-character strings Na, Nb in step S8 and outputs the check code, in this case likewise in step S8. In the same way, the hearing device 4 also generates a check code Vb in a step S9 with staggered timing or simultaneously and likewise outputs the check code, in this case also in step S9. The respective check code Va, Vb is generated by both devices 4, 6 in this case, in each case by using a function G. The check code Va, Vb in this case is a six-digit numeric string in each case. If a "man-in-the-middle" attack has taken place, the two check codes Va, Vb have a high probability of being different.

Both devices 4, 6 now wait for the respective check code Va, Vb to be confirmed by a user in a respective step S10, S11. The user can now compare the two check codes Va, Vb and, in the event of a match, input a confirmation on each of the two devices 4, 6. The check of the check codes Va, Vb by the user is itself not part of the method; the method itself in this case includes just the waiting for a confirmation and the acceptance thereof if a confirmation takes place. The authentication is then completed successfully and then the short-range radio connection 2 is set up if a confirmation from the user that the check codes Va, Vb that have been output match is received through the respective input element 8, 12. In the case of the Bluetooth connection shown herein, the "numeric comparison" method according to the cited Bluetooth specification is therefore performed. The confirmation is a simple input that is merely used for confirmation but does not include an input of a key or of a check code Va, Vb.

The input element 8 of the hearing device 4 allows a "yes/no" input, i.e. a selection of one of two responses, in the exemplary embodiment shown. An input element 8 (not shown) that allows just a single response, which is then rated as "yes", i.e. as a confirmation, is likewise suitable too. The absence of a response is then in particular rated as "no," i.e. as a rejection.

The hearing device 4 shown is configured to carry out the method as described above. To this end, the hearing device 4 has a control unit 16 in which the method steps carried out by the hearing device 4, in this case steps S1, S5, S7, S8, S10, are implemented by programming or circuitry, or a combination thereof.

The hearing device 4 shown herein is used for treating a user with impaired hearing. To this end, the hearing device 4 has a microphone, which is not explicitly denoted, that picks up sound from the surroundings and generates an electrical input signal. That signal is fed to a signal processor, not depicted, of the hearing device 4 for modification. The signal processor in this case is a part of the control unit 16 of the hearing device 4. The modification takes place on the basis of an individual audiogram of the user associated with the hearing device 4, so that an individual hearing deficiency of the user is compensated for. As a result the signal processor outputs an electrical output signal that is then converted back into sound and output to the user through the receiver 10 of the hearing device 4. In an alternative that is not shown, the hearing device 4 is configured just to output sound from an audio source and accordingly has a receiver 10, for sound output, and an input, for receiving an electrical audio signal from the audio source. By way of example, the hearing device 4 is headphones. In the exemplary embodiment shown herein, the hearing device 4 is moreover a binaural hearing device 4, having two individual devices that, when used as intended, are worn by the user on different sides of the head, namely one in or on the left ear and one in or on the right ear.

In the configuration shown, the hearing device 4 identifies itself as a device that has both an input element 8 and an output element 10. The result of this, specifically when setting up a Bluetooth connection, is that the hearing device 4 identifies itself as a device of the "display yes/no" class. Although the hearing device 4 does not have a screen, it nevertheless indicates the "display" property, since, as an alternative to a screen, the receiver 10 is used as output element. Since the switch 8 means that there is also a simple input capability, the "yes/no" property is indicated in this regard.

In the exemplary embodiment shown, the additional device 6 is a mobile terminal and specifically a smartphone, alternatively a notebook, tablet, TV set or the like. In each case, the additional device 6 has both an output element 14 and an input element 12. The input element 12 and the output element 14 are collectively a screen of the additional device 6 in this case. The method involves the additional device 6 identifying itself as a device of the "keyboard display" or at least "display yes/no" class according to the cited Bluetooth specification in the present case.

In the present case, the hearing device 4 has a text-to-speech module 18 that the hearing device 4 uses to convert the check code Vb into an audio signal for output through the receiver 10. Therefore, the check code Vb is output as speech on the hearing device 4 and read aloud, as it were, to the user, so that the user can hear and understand the check code Vb and can compare it with the check code Va displayed on the screen of the additional device 6. The text-to-speech module 18 is a part of the control unit 16 in this case.

The authentication and therefore also the setup of the short-range radio connection 2 are terminated in the present case if a rejection is detected or assumed. This is possible in various ways; four possible configurations are indicated below, which are basically also combinable with one another.

In a first configuration, the authentication is terminated if a rejection from the user is received. The switch 8 of the hearing device 4 is in the form of a two-way switch, for inputting a confirmation on one hand and a rejection on the other hand. This advantageously allows the user to actively display a rejection. The rejection is therefore also referred to as active rejection in this case.

In a second configuration, the authentication is terminated if a rejection from the user is received, the switch 8 of the hearing device 4 being in a form such that a confirmation and a rejection can be input by operating the switch 8 for different lengths of time. In this case too, the rejection is an active rejection, since the user can explicitly perform an applicable input. Instead of using a two-way switch or generally a switch 8 having multiple switching positions, however, a simple pushbutton switch or button is now already sufficient, since a confirmation or rejection can be displayed just by using the period of operation. Accordingly, the switch 8 is a pushbutton switch or button, for example.

In a third configuration, the authentication is terminated automatically if no confirmation is received over a predetermined period, i.e. no operation of the switch 8. The rejection is therefore also referred to as passive rejection, since in contrast to the aforementioned active rejection there is now no call for active action by the user. The period is 1 s to 1 min, for example.

In a fourth configuration, the authentication is terminated if the hearing device 4 is switched off by the user. Precisely how the hearing device 4 can be switched off is of lesser significance, e.g. the hearing device 4 has an on/off switch for this purpose. The switching off of the hearing device 4 is interpreted as rejection in this instance. Since an explicit action by the user is required, an active rejection is present in this case.

The following is a summary list of reference numerals and the corresponding structure used in the above description of the invention:
2 short-range radio connection
4 hearing device
6 additional device
8 switch, input element
10 receiver, output element
12 input element
14 output element
16 control unit
18 text-to-speech module
Cb confirmation key
F function
G function
Na character string
Nb character string
Va check code
Vb check code

The invention claimed is:

1. A method for setting up a short-range radio connection or a Bluetooth connection between a hearing device and an additional device, the method comprising:
providing the hearing device with a switch as an input element and a receiver as an output element;
providing the additional device with an input element and an output element;
carrying out a reciprocal authentication by using each of the devices to generate a respective one of two character strings and transmit each of the respective character strings to the other device and by subsequently generating a check code on both devices using both character strings and outputting the check code to a user through the output elements;
successfully completing the authentication and then setting up a short-range radio connection upon a confirmation from the user, being received through the respective input element, that the output check codes match; and
using the hearing device to identify itself as a device having both the input element and the output element.

2. The method according to claim 1, which further comprises:
providing a mobile terminal or a smartphone as the additional device; and
providing a screen of the additional device as the output element and providing a switch, a pushbutton switch or the screen of the additional device as the input element.

3. The method according to claim 1, which further comprises providing the hearing device with a text-to-speech module used by the hearing device to convert the check code into an audio signal for output through the receiver.

4. A method for setting up a short-range radio connection or a Bluetooth connection between a hearing device and an additional device, the method comprising:
providing the hearing device with a switch as an input element and a receiver as an output element;
providing the additional device with an input element and an output element;
carrying out a reciprocal authentication by using each of the devices to generate a respective one of two character strings and transmit each of the respective character strings to the other device and by subsequently generating a check code on both devices using both character strings and outputting the check code to a user through the output elements;
successfully completing the authentication and then setting up a short-range radio connection upon a confirmation from the user, being received through the respective input element, that the output check codes match;
terminating the authentication upon receiving a rejection from the user; and
providing the switch of the hearing device as a two-way switch for inputting a confirmation and a rejection.

5. A method for setting up a short-range radio connection or a Bluetooth connection between a hearing device and an additional device, the method comprising:
providing the hearing device with a switch as an input element and a receiver as an output element;
providing the additional device with an input element and an output element;
carrying out a reciprocal authentication by using each of the devices to generate a respective one of two character strings and transmit each of the respective character strings to the other device and by subsequently generating a check code on both devices using both character strings and outputting the check code to a user through the output elements;
successfully completing the authentication and then setting up a short-range radio connection upon a confirmation from the user, being received through the respective input element, that the output check codes match;
terminating the authentication upon receiving a rejection from the user; and
using the switch of the hearing device to input a confirmation or a rejection by operating the switch for different lengths of time.

6. The method according to claim 1, which further comprises terminating the authentication when no confirmation is received over a predetermined period of time.

7. The method according to claim 1, which further comprises terminating the authentication upon the hearing device being switched off by the user.

8. A hearing device configured to carry out the method according to claim 1.

* * * * *